United States Patent
Annampedu et al.

(10) Patent No.: US 8,199,422 B2
(45) Date of Patent: Jun. 12, 2012

(54) METHODS AND APPARATUS FOR GAIN ESTIMATION USING SERVO DATA WITH IMPROVED BIAS CORRECTION

(75) Inventors: Viswanath Annampedu, Schnecksville, PA (US); Xun Zhang, Westford, MA (US)

(73) Assignee: LSI Corporation, Milpitas, CA (US)

( * ) Notice: Subject to any disclaimer, the term of this patent is extended or adjusted under 35 U.S.C. 154(b) by 151 days.

(21) Appl. No.: 12/847,661

(22) Filed: Jul. 30, 2010

(65) Prior Publication Data

US 2012/0026620 A1 Feb. 2, 2012

(51) Int. Cl.
*G11B 20/10* (2006.01)

(52) U.S. Cl. .......................................................... 360/39

(58) Field of Classification Search ..................... 360/39, 360/31, 40, 42, 48, 49, 50, 51, 75
See application file for complete search history.

(56) References Cited

U.S. PATENT DOCUMENTS

| | | | |
|---|---|---|---|
| 5,835,295 A | 11/1998 | Behrens | |
| 6,111,710 A | 8/2000 | Feyh et al. | |
| 7,446,968 B2 | 11/2008 | Giovenzana et al. | |
| 8,049,982 B1 * | 11/2011 | Grundvig et al. | 360/50 |
| 2006/0007571 A1 | 1/2006 | Pan et al. | |
| 2006/0023328 A1 | 2/2006 | Annampedu | |
| 2006/0132953 A1* | 6/2006 | Asakura et al. | 360/48 |
| 2006/0256463 A1 | 11/2006 | Ozdemir | |
| 2008/0192379 A1* | 8/2008 | Kurita et al. | 360/75 |
| 2009/0027800 A1* | 1/2009 | Iwamoto et al. | 360/75 |

* cited by examiner

*Primary Examiner* — Fred Tzeng

(57) ABSTRACT

Methods and apparatus are provided for gain estimation using servo data with improved bias correction. The gain is estimated using a preamble in a servo sector by obtaining a first gain estimate using a first gain estimation algorithm (such as a Zero Gain Start Algorithm) and a first portion of the preamble; storing the first portion of the preamble in a memory buffer; obtaining a second gain estimate using a second gain estimation algorithm (such as a Zero Forcing algorithm) and the first portion of the preamble; and processing Servo Address Mark (SAM) and Gray data in the servo sector using the first gain estimate substantially simultaneous to the step of obtaining the second gain estimate. A gain error can be obtained by calculating a difference between the first gain estimate and the second gain estimate. The gain error can be used in burst processing of the servo data.

20 Claims, 3 Drawing Sheets

METHODS AND APPARATUS FOR GAIN ESTIMATION USING SERVO DATA WITH IMPROVED BIAS CORRECTION

FIELD OF THE INVENTION

The present invention generally relates to techniques for use in magnetic recording systems and, more particularly, to improved techniques for gain error estimation in such magnetic recording systems.

BACKGROUND OF THE INVENTION

A read channel integrated circuit (IC) is one of the core electronic components in a modern magnetic recording system, such as a hard disk drive. A read channel converts and encodes data to enable the heads to write data to the disk drive and then read back the data accurately. The disks in a drive typically have many tracks on them. Each track typically consists of mostly user or "read" data sectors, as well as control or "servo" data sectors embedded between the read sectors. The servo sectors help to position the magnetic recording head on a track so that the information stored in the read sectors is retrieved properly.

The servo data format includes a preamble pattern that is used to estimate the timing and gain information. Gain error estimation is currently performed in two steps. Initially, an initial gain error estimate is obtained using, for example, a Zero Gain Start (ZGS) technique based on a Discrete Fourier Transform (DFT) technique. The initial gain error estimate is then followed by another gain error estimation using, for example, a more precise Zero Forcing (ZF) algorithm. While this conventional technique is accurate, a number of preamble cycles are consumed, which impairs the format efficiency.

Thus, a need exists for improved techniques for gain error estimation in magnetic recording systems, such as hard disk drives.

SUMMARY OF THE INVENTION

Generally, methods and apparatus are provided for gain estimation using servo data with improved bias correction. According to one aspect of the invention, the gain is estimated using a preamble in a servo sector by obtaining a first gain estimate using a first gain estimation algorithm and a first portion of the preamble; storing the first portion of the preamble in a memory buffer; obtaining a second gain estimate using a second gain estimation algorithm and the first portion of the preamble; and processing Servo Address Mark (SAM) and Gray data in the servo sector using the first gain estimate substantially simultaneous to the step of obtaining the second gain estimate.

Thus, a first gain estimate can be initially obtained and used to process the SAM and Gray servo data fields, while a second gain estimate (typically, more precise than the first) is obtained in parallel with the SAM/Gray processing. A gain error can be obtained by calculating a difference between the first gain estimate and the second gain estimate. The gain error can be used in burst processing of the servo data.

The first gain estimation algorithm can be based, for example, on a Discrete Fourier Transform (DFT), such as a Zero Gain Start (ZGS) technique. The second gain estimation algorithm can be based, for example, on a Zero Forcing (ZF) algorithm. Alternatively, the second gain estimation algorithm can be based, for example, on a Zero Gain Start (ZGS) technique.

It is to be understood that since writing data to, storing data in, and reading data from a magnetic recording medium may be considered a transmission channel (medium) that has an associated frequency response, the techniques of the present invention are more generally applicable to any digital transmission systems such that detection of digital data represented by a sequence of symbols, where each symbol may be made up of a group of bits, may be improved.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative magnetic recording system embodiment. However, it is to be understood that the present invention is not so limited. Rather, as will be evident, the techniques of the invention may be more generally applied to improve digital data detection in any data encoding system or, more generally, in any digital transmission system.

The detailed description will first describe and illustrate an exemplary magnetic recording system employing a servo encoding system which may be modified to implement the techniques of the present invention. The detailed description will then describe and illustrate a magnetic recording system and associated techniques for use therein in accordance with embodiments of the present invention.

Figure 1:
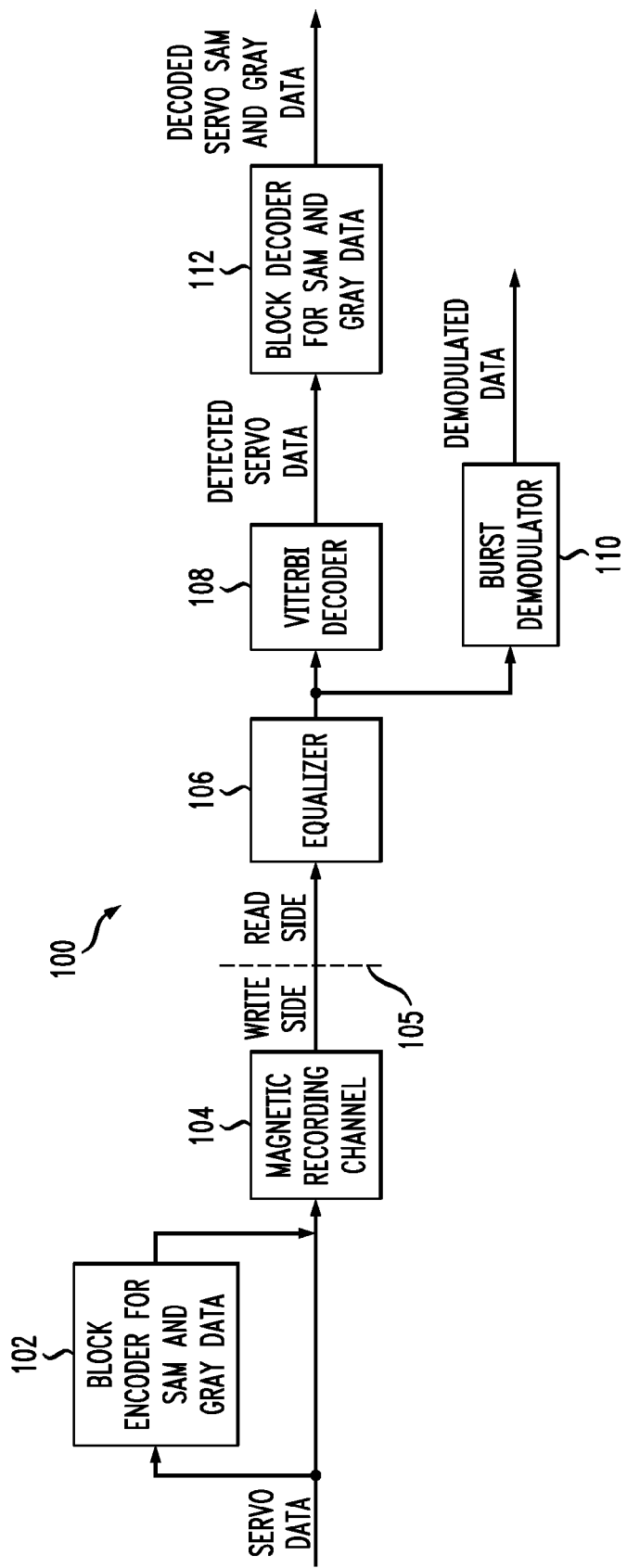
FIG. 1 is a block diagram illustrating an exemplary magnetic recording system which may be modified to implement the techniques of the present invention.

Referring initially to FIG. 1, an exemplary magnetic recording system is illustrated, particularly focusing on the components involved in servo data processing, which (as will be further explained and illustrated) may be modified to implement the techniques of the present invention. As shown, a magnetic recording system 100 may comprise a servo data block encoder 102, a magnetic recording channel 104, an equalizer 106, a Viterbi decoder 108, a burst demodulator 110, and a servo data block decoder 112. As is known, magnetic recording systems such as the one illustrated in FIG. 1 employ digital signal processing to detect servo data, as compared with older systems which employ analog techniques. For a more detailed discussion of exemplary magnetic recording systems 100, see, for example, U.S. Pat. No. 7,082,005, incorporated by reference herein.

Figure 2:
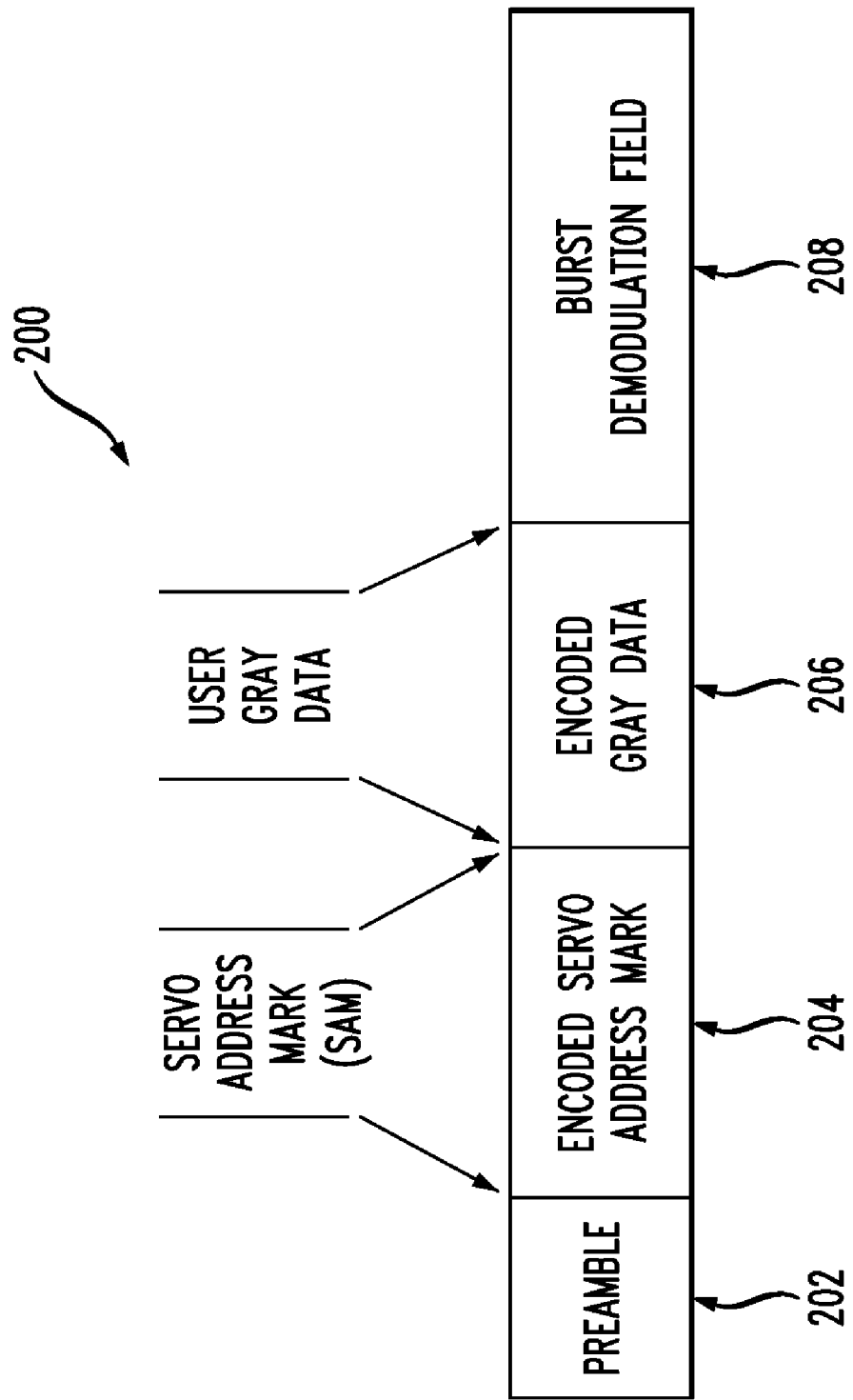
FIG. 2 is a diagram illustrating a servo data format.

FIG. 2 illustrates a servo data format 200 of a servo sector. As shown, a servo sector may comprise a servo preamble pattern 202 which allows the system to recover the timing and gain of the written servo data. The preamble is typically followed by a servo address mark (SAM) 204 which is the same for all servo sectors. The SAM is then followed by encoded servo Gray data 206. The Gray data is followed by one or more burst demodulation fields 208.

The SAM 204 typically comprises some fixed number of bits. The Gray data 206 represents the track number/cylinder information and serves as a coarse positioning for the magnetic head of the recording system. The burst demodulation fields 208 serve as a fine positioning system for the head to be on track.

Thus, with reference back to FIG. 1, on the write side of operations, servo data is encoded by the block encoder 102 and written to a magnetic medium such as a disk (denoted as 105) via the magnetic recording channel 104. Portions of the servo data that are not encoded may also be written to the medium 105. It is understood that a magnetic write head, while not expressly shown, is functionally interposed between the magnetic recording channel 104 and the magnetic medium 105 for writing data to the medium. On the read side of operations, the servo data is read from the magnetic medium 105 via a magnetic read head (not expressly shown but understood to be functionally interposed between the medium 105 and the equalizer 106) and then equalized in accordance with the equalizer 106. The servo data is then sampled at a nominal sampling rate (not shown) and detected by the Viterbi decoder 108. The Gray data portion of the detected servo data is then decoded by the block decoder 112, while the burst demodulation field portion of the servo data is demodulated by the burst demodulator 110 to fine position the read head to be on track.

Figure 3:
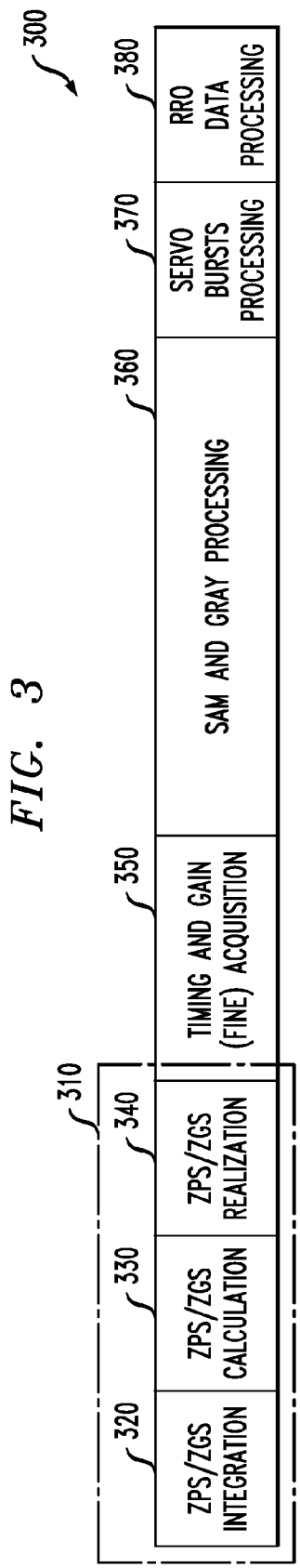
FIG. 3 illustrates a conventional technique for servo data processing.

FIG. 3 illustrates a conventional technique 300 for servo data processing. As previously indicated, the servo data format 200 includes a preamble pattern 202 that is used to estimate the timing and gain information. Timing and gain estimation are typically performed in two steps. Initially, a coarse estimation 310 is performed using Discrete Fourier Transform (DFT) techniques. The coarse estimation 310 is followed by a fine estimation 350 using a more precise Zero Forcing (ZF) algorithm.

The conventional coarse estimation 310 estimates the timing using a Zero Phase Start (ZPS) technique and estimates the gain using a Zero Gain Start (ZGS) technique. For a detailed discussion of suitable ZPS and ZGS techniques, see, for example, U.S. Pat. No. 7,529,320, incorporated by reference herein. As shown in FIG. 3, the conventional coarse estimation 310 integrates, calculates and realizes the timing and gain estimates in three distinct steps 320, 330, 340, respectively.

The SAM and Gray data portions 204, 206 of the detected servo data are then processed during step 360 by the block decoder 112. In addition, the burst demodulation field portion 208 of the servo data is demodulated by the burst demodulator 110 during step 370 to fine position the read head to be on track.

The Repeatable Runout (RRO) data field is processed during step 380, in a known manner. Generally, the RRO data field (not shown in FIG. 2) includes head positioning information that is more precise than that provided by the encoded Gray data field and coarser than that provided by the burst demodulation field 216.

The conventional technique 300 consumes a number of preamble cycles, which impairs the format efficiency. For example, one implementation requires a preamble to be 20 cycles, where each cycle is 4T (one sine wave period) and comprises 4 bits (or one symbol duration).

The present invention recognizes that the more precise gain estimate generated by the fine estimation step 350 is not required for processing all fields of the servo data 200. In particular, the present invention recognizes that precise gain information is not needed for processing the SAM and Gray servo data fields 204, 206. Rather, the precise gain information generated by the fine estimation step 350 is only needed to process the burst demodulation field 208. According to one aspect of the invention, a first gain estimate is initially obtained and used to process the SAM and Gray servo data fields 204, 206 while a second gain estimate is obtained in parallel with the SAM/Gray processing.

Figure 4:
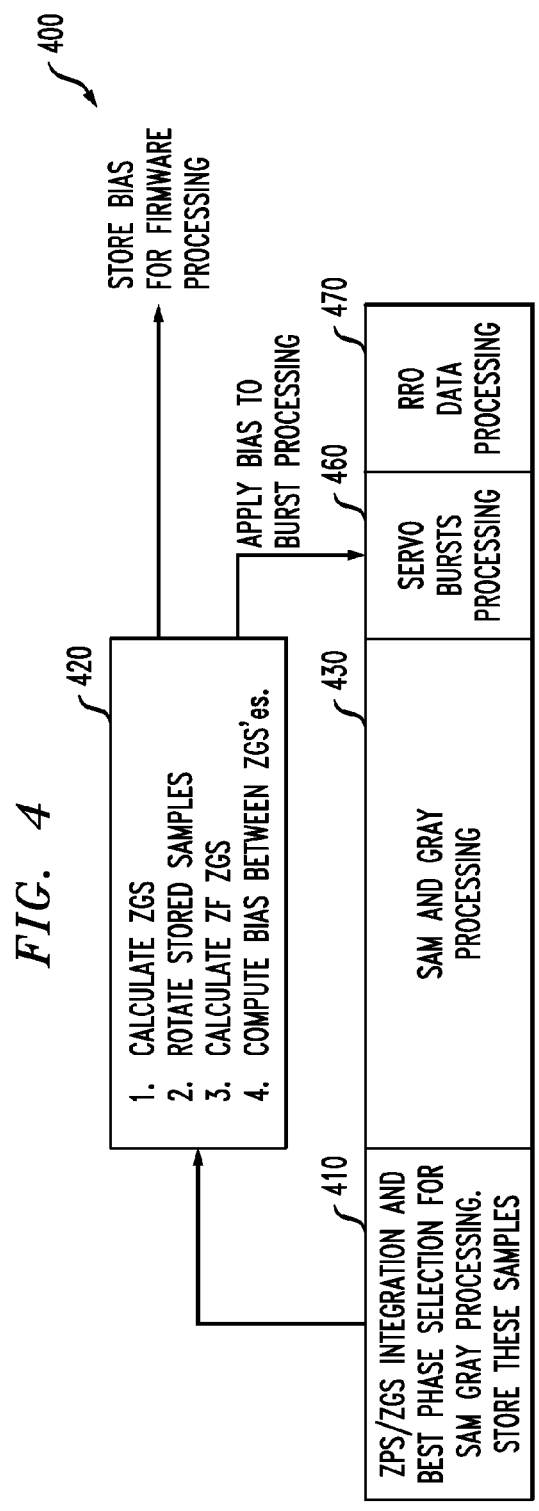
FIG. 4 illustrates a technique 300 servo data processing that incorporates aspects of the present invention.

FIG. 4 illustrates a process 400 for servo data processing that incorporates aspects of the present invention. As shown in FIG. 4, a first gain and timing estimation 410 is performed using DFT-based ZPS and ZGS techniques. The first gain estimate is then used in parallel for SAM/Gray processing and to obtain a second gain estimate required for burst demodulation processing.

As shown in FIG. 4, the samples used to compute the first timing and gain estimates are stored during step 410 in a memory buffer. The SAM and Gray data portions 204, 206 of the detected servo data are then processed during step 430 by the block decoder 112 using the first timing and gain estimates computed during step 410.

As shown in FIG. 4, during step 420, the first timing and gain estimates obtained during step 410 are used as follows. First, the ZGS is computed (step 1). Thereafter, the stored samples are rotated to obtain the peak zero sampling phase (step 2). The stored samples are rotated, for example, in a known manner, by multiplying the samples by a filter having coefficients that are based on a ZPS phase offset. This phase can be obtained, for example, using a DFT-based ZPS phase estimation while doing the ZGS gain estimation. The absolute value of the peaks will be averaged and compared to the ZGS gain estimate. The new gain estimate is calculated during step 3 using a Zero Forcing technique. The new ZF gain estimate is compared to the DFT based gain estimate from step 410 and the resultant bias value (gain error) is computed during step 4. The computed bias value can optionally be stored in a register or buffer for use during burst processing. The burst demodulation field portion 208 of the servo data is demodulated by the burst demodulator 110 during step 460 to fine position the read head to be on track. Alternatively, the hardware can reflect that bias change in the result of burst processing.

The Repeatable Runout (RRO) data field is processed during step 470, in a known manner. Generally, the RRO data field (not shown in FIG. 2) includes head positioning information that is more precise than that provided by the encoded Gray data field and coarser than that provided by the burst demodulation field 216.

It is to be understood that the functional elements of the read side of the magnetic recording system 100 in FIG. 1 may be implemented in accordance with a processor and associated memory. The processor and memory may preferably be part of a digital signal processor (DSP) used to implement the read channel. However, it is to be understood that the term "processor" as used herein is generally intended to include one or more processing devices and/or other processing circuitry. For example, the invention may be implemented as an application-specific integrated circuit (ASIC) or as another type of integrated circuit, e.g., a read channel integrated circuit. The term "memory" as used herein is generally intended to include memory associated with the one or more processing devices and/or circuitry, such as, for example, RAM, ROM, a fixed and removable memory devices, etc.

Accordingly, software components including instructions or code for performing the methodologies of the invention, as described herein, may be stored in the memory associated with the read channel processor and, when ready to be utilized, loaded in part or in whole and executed by one or more of the processing devices and/or circuitry of the read channel processor.

The invention may be applied to any servo encoded system (encoder-independent schemes), with appropriate modifications as dictated by the encoder code constraints. Given the inventive teachings provided herein, such modifications are well within the skill level of the ordinary artisan.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of gain estimation using a preamble in a servo sector, comprising:
   obtaining a first gain estimate using a first gain estimation algorithm and a first portion of the preamble;
   storing the first portion of the preamble in a memory buffer;
   obtaining a second gain estimate using a second gain estimation algorithm and said first portion of the preamble; and
   processing Servo Address Mark (SAM) and Gray data in the servo sector using said first gain estimate substantially simultaneous to said step of obtaining said second gain estimate.

2. The method of claim 1, further comprising the step of calculating a difference between the first gain estimate and the second gain estimate to obtain a gain error.

3. The method of claim 2, further comprising the step of using said gain error in burst processing of the servo data.

4. The method of claim 1, wherein said first gain estimation algorithm is based on a Discrete Fourier Transform (DFT).

5. The method of claim 1, wherein said first gain estimation algorithm is based on a Zero Gain Start (ZGS) technique.

6. The method of claim 1, wherein said second gain estimation algorithm is based on a Zero Forcing (ZF) algorithm.

7. The method of claim 1, wherein said second gain estimation algorithm is based on a Zero Gain Start (ZGS) technique.

8. A system for gain estimation using a preamble in a servo sector, comprising:
   at least one processor operative to:
   obtain a first gain estimate using a first gain estimation algorithm and a first portion of the preamble;
   store the first portion of the preamble in a memory buffer;
   obtain a second gain estimate using a second gain estimation algorithm and said first portion of the preamble; and
   process Servo Address Mark (SAM) and Gray data in the servo sector using said first gain estimate substantially simultaneous to said step of obtaining said second gain estimate.

9. The system of claim 8, wherein said at least one processor is further configured to calculate a difference between the first gain estimate and the second gain estimate to obtain a gain error.

10. The system of claim 9, wherein said at least one processor is further configured to use said gain error in burst processing of the servo data.

11. The system of claim 8, wherein said first gain estimation algorithm is based on a Discrete Fourier Transform (DFT).

12. The system of claim 8, wherein said first gain estimation algorithm is based on a Zero Gain Start (ZGS) technique.

13. The system of claim 8, wherein said second gain estimation algorithm is based on a Zero Forcing (ZF) algorithm.

14. The system of claim 8, wherein said second gain estimation algorithm is based on a Zero Gain Start (ZGS) technique.

15. An integrated circuit for gain estimation using a preamble in a servo sector, the integrated circuit operative to perform operations comprising:
   obtaining a first gain estimate using a first gain estimation algorithm and a first portion of the preamble;
   storing the first portion of the preamble in a memory buffer;
   obtaining a second gain estimate using a second gain estimation algorithm and said first portion of the preamble; and
   processing Servo Address Mark (SAM) and Gray data in the servo sector using said first gain estimate substantially simultaneous to said step of obtaining said second gain estimate.

16. The integrated circuit of claim 15, further comprising the step of calculating a difference between the first gain estimate and the second gain estimate to obtain a gain error.

17. The integrated circuit of claim 16, further comprising the step of using said gain error in burst processing of the servo data.

18. The integrated circuit of claim 15, wherein said first gain estimation algorithm is based on a Discrete Fourier Transform (DFT).

19. The integrated circuit of claim 15, wherein one or more of said first and second gain estimation algorithms are based on a Zero Gain Start (ZGS) technique.

20. The integrated circuit of claim 15, wherein said second gain estimation algorithm is based on a Zero Forcing (ZF) algorithm.

* * * * *